March 5, 1968  T. D. ALLER  3,371,612
DRIVER UNIT
Filed Dec. 28, 1965

INVENTOR
T. Dwight Aller

BY Hastings Ackley
and
Walter J. Jay
ATTORNEYS

United States Patent Office 3,371,612
Patented Mar. 5, 1968

3,371,612
DRIVER UNIT
T. Dwight Aller, 4201 Stanford, Dallas, Tex. 75225
Filed Dec. 28, 1965, Ser. No. 517,008
7 Claims. (Cl. 103—87)

ABSTRACT OF THE DISCLOSURE

An immersible pump whose driver means is sealed in a housing.

This invention relates to drive units and more particularly to an immersible drive unit and to an assembly of the drive unit and a pump driven by the unit.

An object of this invention is to provide a new and improved drive unit which will function properly when immersed in liquid and which may be used to drive a pump or the like.

Another object is to provide a drive unit which is sealed to prevent liquid from reaching its operative parts.

Still another object is to provide a drive unit having an electric motor sealed in a housing wherein the housing and the motor cooperate to facilitate heat transfer from the motor to the exterior of the housing.

A further object is to provide a drive unit having an induction type electric motor whose stator has a lower portion, on which its rotor is mounted, disposed in an upwardly open housing and an upper portion, on which its field coil is mounted, embedded in a non-conductive substance which also closes the housing above the rotor thus preventing flow of current from the coil to the water and housing in the event water flows into the housing past a seal which seals between the housing and the drive shaft of the motor.

A still further object is to provide a drive unit wherein the stator has large areas of contact with the housing and the housing has a large area of its exterior surface exposed to facilitate heat transfer from the stator to the exterior of the housing.

Another object is to provide a drive unit and pump assembly wherein the pump is secured to the housing of the drive unit.

Still another object is to provide a drive unit and pump assembly wherein the pump and the drive unit housing have cooperable means for easily and quickly installing the pump on the drive unit housing.

Additional objects and advantages of the invention will be readily apparent from the reading of the following description of a device constructed in accordance with the invention, and reference to the accompanying drawings thereof, wherein.

Figure 4:
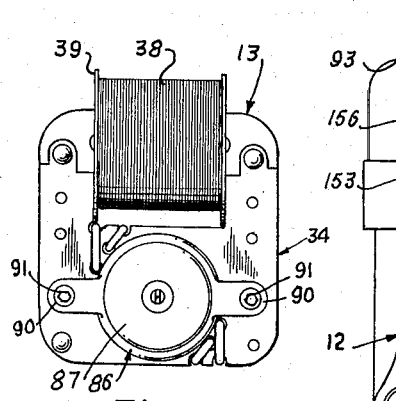
FIGURE 4 is a front view of the electric motor of the drive unit.
Figure 1:
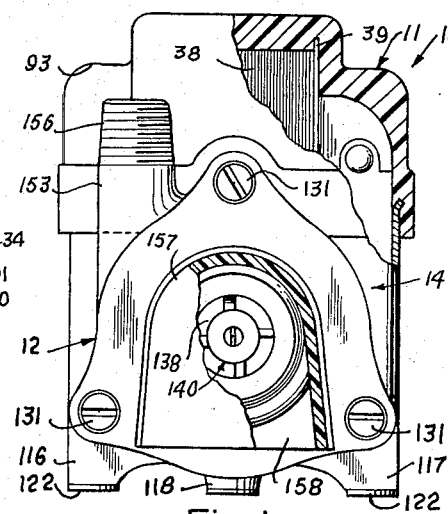
FIGURE 1 is a front view with some portions broken away of the drive unit and pump assembly embodying the invention.
Figure 5:
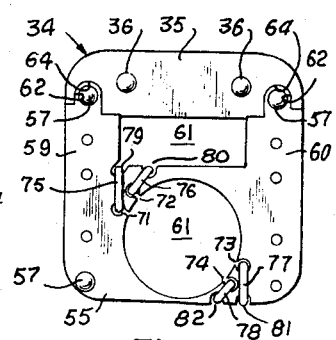
FIGURE 5 is a front view of the stator of the electric motor.

Referring now to the drawings, the drive unit and pump assembly 10 includes a drive unit 11 and a pump 12 driven by the electric motor 13 on the drive unit. The drive unit includes a housing 14 of substantially open top box configuration having a horizontal bottom wall 15, rear and front walls 16 and 17, respectively, and side walls 18 and 19. The housing is formed of a non-magnetic substance, such as brass, which has good heat conductive properties. The front wall 17 has an aperture 20 and a vertical adaptor ring 24 extends about the aperture 20 and abuts the outer surface of the front wall. The adaptor ring 24 is rigidly secured to the front housing wall, as by soldering, brazing or the like.

Figure 2:
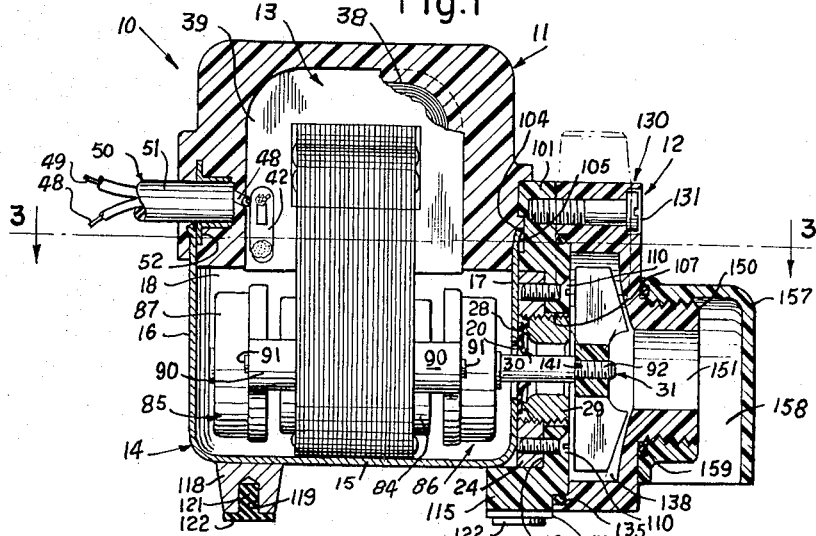
FIGURE 2 is a vertical sectional view of the drive unit and pump assembly taken on line 2—2 of FIGURE 3.
Figure 3:
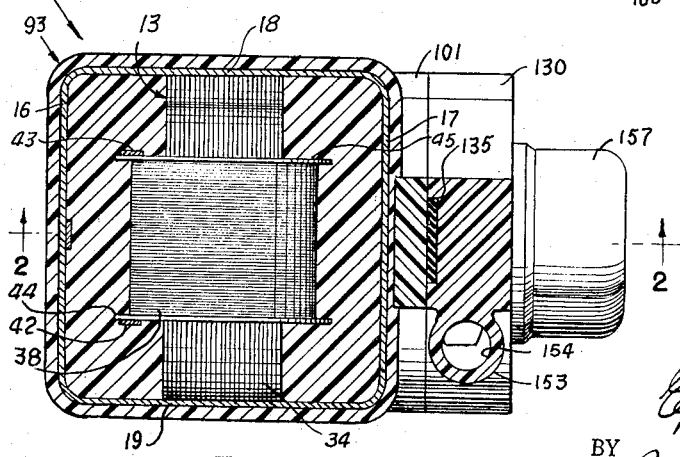
FIGURE 3 is a horizontal sectional view taken on line 3—3 of FIGURE 2.

The internal diameter of the adaptor ring 24 is considerably greater than the diameter of the shaft aperture or opening 20 of the housing so that a resilient seal ring 28 may be compressed against the outer surface of the front wall within the adaptor ring and about the shaft aperture by a seal nut 29 threaded in the adaptor ring. The seal ring has a central aperture 30 through which the drive shaft 31 of the electric motor 13 extends. The seal ring aperture is inherently of smaller diameter than the diameter of the drive shaft 31 it engages. During the installation of the motor into the housing, as the seal ring is placed on the outer end of the drive shaft and then moved to engage the outer surface of the front housing wall, the central portion of the seal ring is stretched resiliently, assumes the outwardly convex configuration illustrated in FIGURE 2 and sealingly engages the drive shaft.

When the motor of the drive unit is immersed in a liquid such as water in a tank, the pressure of the water acting on the central convex portion of the seal ring exerts a force of the seal ring tending to hold it in sealing engagement with the drive shaft.

The electric motor 13 includes a stator 34 of substantially rectangular configuration as seen from the front. The stator 34 includes a top coil section 35 formed of laminations of a magnetic substance, such as iron, which are rigidly secured to one another by rivets 36 which extend through suitable aligned apertures in the laminations. The field coil 38 is wound on a hollow rectangular bobbin 39 of a suitable insulating substance, such as nylon. The bobbin is disposed about the stator top section intermediate its ends. The opposite ends of the insulated wire of which the field coil is wound are secured to the terminal lugs 42 and 43 secured to the vertical flanges 44 and 45 of the bobbin. The conductors 48 and 49 of a cord 50 are secured to the terminals 42 and 43, respectively. The outer insulating sheath 51 of the cord extends through a tubular strain relief bushing 52 positioned inwardly of the rear housing wall 16.

The bottom or rotor section 55 of the stator is formed of iron laminations rigidly secured to one another by rivets 57 which extend through aligned apertures of the laminations. The bottom stator section has vertical upstanding legs 59 and 60 which together with the top stator section define a rectangular aperture 61 in which the lower portion of the bobbin is disposed. The legs of the bottom stator section have upwardly extending lugs 62 which are received in the downwardly opening recesses 64 of the top stator section. The tight fit of the lugs in the recesses holds the two stator sections against disengagement.

The bottom stator section has a rotor aperture 61 and slots 71, 72, 73 and 74 which open to the rotor aperture and in which are disposed the inner portions of the shading coils 75, 76, 77 and 78, respectively. The shading coils are preferably closed loops of copper wire whose outer portions are disposed in the slots 79, 80, 81 and 82 of the bottom stator section.

The drive shaft 31 of the squirrel cage armature or rotor 84 is rotatably supported by bearing assemblies 85 and 86 whose housings 87 are provided with integral spacer posts 90. The two housings are rigidly secured to the bottom stator section by rivets 91 which extend through aligned transversely offset spacer posts of the two housings and apertures of the bottom stator section.

The outer vertical side surfaces of the bottom stator section are spaced a distance equal to or very slightly greater than the internal surfaces of the side walls 18 and 19 of the housing so that when the stator is positioned in the housing, opposite side surfaces of the bottom stator section, which are formed by the vertical edges of the laminations of which the bottom stator section is formed, firmly engage the internal surfaces of the side walls 18 and 19, which may bend slightly outwardly if the stator sides are spaced apart a greater distance than the housing sides, and the bottom surface of the bottom stator section firmly engages the inner or top surface of the bottom wall 15. This firm engagement of the bottom stator section with the bottom and side walls of the housing insures good heat conduction from the stator to the housing.

The motor 13 is easily inserted into the housing by tilting the motor to incline the front threaded end portion 92 of its drive shaft 31 toward the shaft aperture 20 of the front housing wall as the motor is lowered thereinto and then outwardly through the shaft aperture as the motor moves to position wherein the stator engages the bottom wall. The drive shaft then extends horizontally through the shaft aperture. The seal ring 28 is then moved rearwardly over the drive shaft and the seal nut 29 is threaded in the adaptor ring. A cap 93 of a suitable electrically non-conducting plastic, such as an epoxy resin, is then moulded about upper portions of the stator and the housing to close the spaces between the stator and top of the housing and enclose the field coil 38, the terminals 42 and 43 and the inner ends of the cable conductors 49 and 48. If desired, the inner section 101 of the pump housing 102 may be secured to the adaptor ring before the electric motor and the housing is inverted and its top portions are lowered into a suitable mold filled with a predetermined amount of a liquid substance which thereafter solidifies to form the cap 93 and hermetically seal the spaces between the stator, the field coil and the housing.

The substantially planar inner housing section 101 has an upper horizontal recess 104 in which is received the outwardly flared top edge portion 105 of the front housing wall. The plastic substance of which the cap is formed fills the recess 104.

The inner pump housing section has a circular aperture 107 in which the outer portion of the seal nut 29 is received and a recess 108 opens to the aperture 107 in which is received the adaptor ring 24. The inner housing section is rigidly secured to the adaptor ring by a plurality of screws 110 which extend through apertures of the inner pump housing section into threaded bores of the adaptor ring. The inner housing section has a horizontal bottom flange 115 which extends below and engages the bottom wall 15 of the driver unit housing 14 to help support the driver unit housing and a pair of transversely spaced feet 116 and 117 which cooperate with the rear foot 118 of the driver unit housing to hold the bottom wall of the driver unit housing spaced above the surface on which the driver unit and pump assembly are supported. The foot 118 is preferably of metal and is secured to the bottom wall in any suitable manner, as by soldering, brazing or welding and has a downwardly opening bore 119 in which the stem 121 of a resilient foot pad or vibration dampener 122 is inserted and held therein by friction. If desired, the downwardly opening bore may be threaden so that if it is desired to rigidly secure the driver unit housing to a supporting structure, the shank of a screw or bolt may be threaded therein. The legs 116 and 117 similarly are provided with downwardly opening bores in which the stems of foot pads 122 are received.

The outer section 130 of the pump housing is rigidly secured to the inner section by a plurality of screws 131 which extend through suitable apertures of the outer section into threaded bores of the inner section. The outer section has an O-ring or other suitable resilient seal means 135 disposed in an internal annular recess thereof which seals between the two sections to prevent flow of fluid from an impeller chamber 138 of the pump housing.

An impeller 140 threaded on the reduced outer end portion 92 of the drive shaft has its inward movement on the drive shaft limited by an external annular shoulder 141 of the drive shaft. The direction of rotation of the drive shaft is such as to tend to cause the impeller to screw further on the drive shaft and be held against the shaft shoulder 141.

The outer pump housing section has a horizontal tubular inlet 150 whose passage 151 communicates with the chamber at the central portion thereof and a tubular vertical outlet 153 whose passage 154 communicates with the chamber at the periphery thereof so that when the motor is energized and the impeller is rotated, liquid is drawn in through the passage 151 of the inlet into the chamber and then is expelled upwardly from the chamber through the passage 154 of the outlet.

The outlet is externally threaded, as at 156, so that a conduit may be secured thereto through which the water moved by the pump may be conducted to a desired location remote from the pump. The housing inlet 150 may be externally threaded and have an inlet strainer 157 thereon whose throat 158 opens downwardly below the inlet. The strainer has an O-ring 159 for sealing between the housing inlet and the strainer. A conduit may be threaded on the housing inlet 150, instead of the strainer, if the pump must be placed at a location remote from the liquid which is to be pumped.

In use, the driver unit and pump assembly may be lowered into a body of liquid, such as may be contained in the reservoir of a fountain. The cord 50 will then extend from such reservoir to an electric outlet box so that when the conductors 48 and 49 are connected thereby to a source of single phase alternating current, the motor will be energized and will rotate the impeller 140 of the pump. As the motor rotates, the liquid in which it is immersed is drawn upwardly through the strainer to the inlet passage 151 and into the chamber 130, and thence through the passage 154 of the outlet 153 to the conduit threaded on the outlet. As the motor continues to operate, the heat generated thereby is conducted, due to the large areas of intimate contact of the stator with the housing, to the housing, and thence to the exterior thereof and to the liquid in which is immersed the assembly of the driver unit and the pump. The housing itself of course has very large areas of contact with the liquid in which it is immersed. The provision of the feet 116, 117, and 118 permits convective flow of liquid below its bottom wall 15. This very effective transfer of heat from the motor to the liquid in which the driver unit is immersed prevents overheating of the motor and therefore damage thereto.

Should the seal ring 28 fail for any reason and permit the liquid to flow into the housing below the cap 93, a dangerous condition will not be created since the coil 38 and the conductors 48 and 49 are isolated from the liquid even if it enters into the housing below the cap. The current induced in the coils of the squirrel cage rotor and in the shading coils of the stator since such coils are closed will not create voltages across the housing or through the liquid.

While the driver unit has been described as being of the immersible type, it may also be used when not immersed in liquid since the very large areas of the housing exposed to the air permit transfer of heat from the motor to the air.

It will now be seen that a new and improved driver unit has been illustrated and described which has an open top housing 14 having a bottom wall and side and end walls extending upwardly from the bottom wall, and an electric motor disposed in the housing having a stator 34 whose surfaces engage the bottom wall and two opposed walls of the housing in good heat conducting relation, a field coil 38 with two conductors 49 and 48 for conducting electric current therethrough, a rotor 84 mounted on the stator in the housing, a cap 93 of electrically non-conductive substance which encapsulates the field coil and the upper portion of the stator and closes the housing at its upper end about the stator and above the rotor, and a seal means such as the seal ring 28 which seals between the housing and the drive shaft 31 and the housing.

It will further be seen that the seal ring is mounted on the exterior of the housing and is held in sealing position by a seal nut 29 which is threaded in an adaptor ring rigidly secured to the exterior of the housing.

It will further be seen that the edge surfaces of the laminations of the stator engage the walls of the housing which further facilitates heat transfer from the stator to the housing since the electrically insulating films or coats of the laminations which prevent or minimize eddy currents in the stator have poor heat conductive properties and the conduction of the heat to the housing would not be as efficient if the sides of the two outermost laminations contacted the walls of the housing.

It will further be seen that a pump 12 is easily mountable on the front wall of the housing due to the provision of the stator ring of the adaptor ring 24, and that the pump housing and the driver unit housing are provided with feet to hold the bottom wall 15 of the driver unit housing spaced above a supporting surface in order to facilitate convective flow of fluid below the driver unit housing.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A driver unit including: an open top housing having a bottom wall and side and end walls extending upwardly from the bottom wall; an electric motor telescoped in said housing and including a stator having surfaces engaging the bottom wall and two opposite walls of said housing in heat conducting relation therewith, a field coil mounted on an upper portion of said stator, conductor means for conducting electric current to said coil; and a rotor mounted on a lower portion of said stator; a cap of electrically non-conductive substance encapsulating said field coil and the upper portion of said stator and closing said housing at its upper end about said stator and above said rotor, said rotor having a drive shaft, one of said walls having an aperture, said shaft extending outwardly of said housing through said aperture; and seal means for sealing between said shaft and said housing.

2. The driver unit of claim 1, wherein said stator comprises a plurality of vertical laminations, edge surfaces of said laminations contacting said bottom wall and said opposed walls of said housing.

3. The driver unit of claim 1, wherein said seal means includes an adaptor ring rigid with said one of said walls about said aperture; an annular seal ring disposed about said aperture and within said adaptor ring; and means releasably securable to said adapter ring for holding said seal ring in sealing engagement with said one of said walls about said aperture.

4. The driver unit of claim 3, wherein said seal ring is of outwardly convex configuration about said drive shaft.

5. The driver unit of claim 4, wherein said adaptor ring has means for rigidly securing a driven means to said housing for drive by said drive shaft.

6. The drive unit of claim 3; and a pump including a housing having an inner section; means securing said inner section to said adaptor ring, said pump having an outer section rigidly secured to said inner section, said pump housing sections defining an impeller chamber, said drive shaft extending into said impeller chamber; and an impeller secured to said drive shaft, said outer section having an inlet opening to said chamber at its central portion and an outlet opening to said chamber at a peripheral location thereof whereby when said motor is energized the rotation of said impeller causes fluids to be drawn inwardly through said inlet into said impeller chamber and then outwardly through said outlet.

7. The device of claim 6, wherein said pump housing and said driver unit housing are provided with foot means for supporting said housings and holding the bottom wall of said driver unit housing above a supporting surface.

References Cited

UNITED STATES PATENTS

| | | |
|---|---|---|
| 2,981,196 | 4/1961 | Zimmermann et al. __ 103—87 X |
| 3,074,349 | 1/1963 | Zimmermann _____ 103—87 |
| 3,085,513 | 4/1963 | Zimmermann _____ 103—87 |

ROBERT M. WALKER, *Primary Examiner.*